United States Patent
Lu et al.

(10) Patent No.: US 9,413,752 B2
(45) Date of Patent: Aug. 9, 2016

(54) ONE-TIME PASSWORD OPERATING METHOD

(71) Applicant: FEITIAN TECHNOLOGIES CO., LTD., Haidian District, Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 14/233,245

(22) PCT Filed: Oct. 31, 2012

(86) PCT No.: PCT/CN2012/083828
§ 371 (c)(1),
(2) Date: Jan. 16, 2014

(87) PCT Pub. No.: WO2013/143281
PCT Pub. Date: Oct. 3, 2013

(65) Prior Publication Data
US 2015/0304313 A1      Oct. 22, 2015

(30) Foreign Application Priority Data

Mar. 31, 2012   (CN) .......................... 2012 1 0094070

(51) Int. Cl.
*G06F 7/04*      (2006.01)
*G06F 15/16*     (2006.01)
(Continued)

(52) U.S. Cl.
CPC ............ *H04L 63/0838* (2013.01); *G06F 21/31* (2013.01); *G06F 21/575* (2013.01); *H04L 9/3228* (2013.01); *G06F 2221/2137* (2013.01)

(58) Field of Classification Search
CPC ... H04L 63/08; H04L 63/0846; H04L 12/417; H04L 9/3228; H04L 63/0838; H04L 9/00; H04L 29/06; G06F 21/31
USPC .............. 380/277, 44; 713/168, 172, 277, 44; 726/27, 30, 21, 9
See application file for complete search history.

(56) References Cited

U.S. PATENT DOCUMENTS

| | | | |
|---|---|---|---|
| 2006/0265340 A1* | 11/2006 | Ziv ...................... | G06Q 20/341 705/76 |
| 2007/0186105 A1* | 8/2007 | Bailey ................. | H04L 63/0492 713/168 |
| 2011/0099377 A1 | 4/2011 | Hoornaert et al. | |

FOREIGN PATENT DOCUMENTS

| | | |
|---|---|---|
| CN | 101309268 A | 11/2008 |
| CN | 101789864 A | 7/2010 |

(Continued)

OTHER PUBLICATIONS

International Search Report (in Chinese with English translation) and Written Opinion (in Chinese) for PCT/CN2012/083828, mailed Feb. 7, 2013; ISA/CN.

(Continued)

*Primary Examiner* — Ali Abyaneh
*Assistant Examiner* — Feliciano Mejia
(74) *Attorney, Agent, or Firm* — Harness, Dickey & Pierce, P.L.C.

(57) ABSTRACT

Disclosed is a dynamic token operating method. In the method, a key on the dynamic token is pressed down. If a power key is pressed down and a power flag is not set, an unlocking code interface is entered if a lock flag is set. If a delete key is pressed down, data at tail end of a data cache is deleted. If a number key is pressed down, data corresponding to the pressed key is stored in a case that the dynamic token is not in the information interface and a logon password modifying interface is entered or data corresponding to the key pressed down is stored in a case that the dynamic token is in the information interface. If an OK key is pressed down, a dynamic password is generated and displayed in a case that the dynamic token is in the information interface.

18 Claims, 7 Drawing Sheets

(51) Int. Cl.
*G06F 17/30* (2006.01)
*H04L 29/06* (2006.01)
*H04L 9/32* (2006.01)
*G06F 21/31* (2013.01)
*G06F 21/57* (2013.01)

(56) References Cited

FOREIGN PATENT DOCUMENTS

| CN | 102307101 A | 1/2012 |
| CN | 102611556 A | 7/2012 |

OTHER PUBLICATIONS

First Chinese Office Action regarding Application No. 201210094070.9 dated Feb. 8, 2014. English translation provided by Unitalen Attorneys at Law.

Activcard Dynamic Password Token Operating Specification, Shenzhen Syntek Company, Nov. 30, 2001. English translation of abstract provided by Unitalen Attorneys at Law.

\* cited by examiner

ONE-TIME PASSWORD OPERATING METHOD

CROSS-REFERENCE TO RELATED APPLICATIONS

This application is a 371 U.S. National Stage of International Application No. PCT/CN2012/083828 filed on Oct. 31, 2012, which claims priority to Chinese Patent Application No. 201210094070.9, filed on Mar. 31, 2012. The contents of the above applications are incorporated herein by reference in their entirety.

FIELD

The invention relates to information security field, and more particularly, to a working method of a dynamic token.

BACKGROUND

In the prior art, One-time Password (OTP) is a technology for preventing an account number from being stolen reliably and conveniently. An unpredictable random number combination is generated according to a dedicated algorithm, and each password is used for only one time. A user is required to input a one-time password besides an account number and a static password in authentication. The user can login or perform transaction normally only if the user passes the authentication of the system, so as to ensure legitimacy and uniqueness of the user identity effectively. OTP has a prominent advantage that the password used by the user each time is different and thus an illegitimate user can not personate the identity of a legitimate user. OTP authentication technology is regarded as one of the effective ways for authenticating user identity, which can effectively avoid network problems such as stealing password of account number by a hacker or Trojan, fake website, which will cause financial loss or data loss of user. At present, OTP authentication technology is widely used in fields such as e-bank, online game, telecom operator, e-administration and enterprise.

However, the inventors found that the existing password of the dynamic token has 6 or 8 digits and thus has a risk of being cracked by inversing after a stealer obtains a seed or multiple passwords, and the dynamic token is easily to be lost or stolen.

SUMMARY

In view of the defects in the prior art, a working method of a dynamic token is provided according to the present invention, for preventing the dynamic token from being stolen and lost, and avoiding seed file loss and group attack.

The technical solutions provided by the present invention are as follows.

A working method of a dynamic token includes, after the dynamic token detects that its key flag is set, Step A, clearing the key flag, scanning keys and determining type of the key pressed down; performing Step B in a case that the key pressed down is a power key; performing Step D in a case that the key pressed down is a delete key; performing Step E in a case that the key pressed down is a key in a first numeric key group; performing Step F in a case that the key pressed down is a key in a second numeric key group; and performing Step G in a case that the key pressed down is an OK key;

Step B, checking power flag; in a case that the power flag is set, resetting the power flag and entering a dormant state; and in a case that the power flag is not set, setting the power flag and performing Step C;

Step C, checking lock flag; in a case that the lock flag is set, setting state identification to be a first predetermined value and performing Step L; and in a case that the lock flag is not set, setting the state identification to be a second predetermined value and performing Step L;

Step D, checking the power flag; in a case that the power flag is set, deleting one unit data at the end of a data cache, displaying a corresponding number, and performing Step L; and in a case that the power flag is not set, entering the dormant state;

Step E, checking the power flag; in a case that the power flag is set, storing corresponding data into the data cache, displaying a corresponding number, and performing Step L; and in a case that the power flag is not set, entering the dormant state;

Step F, checking the power flag;

in a case that the power flag is set and the state identification is a third predetermined value, determining whether time period for holding the key pressed down exceeds a predetermined time period; setting the state identification to be a fifth predetermined value and performing Step L in a case that the time period for holding the key pressed down exceeds the predetermined time period; and performing Step L directly in a case that the time period for holding the key pressed down does not exceed the predetermined time period;

in a case that the power flag is set and the state identification is not the third predetermined value, storing corresponding data into the data cache, displaying a corresponding number, and performing Step L; and in a case that the power flag is not set, entering the dormant state;

Step G, checking the power flag;

in a case that the power flag is set, checking the state identification; performing Step H in a case that the state identification is the first predetermined value; performing Step I in a case that the state identification is the second predetermined value; performing Step J in a case that the state identification is the third predetermined value; and performing Step K in a case that the state identification is the fifth predetermined value; and in a case that the power flag is not set, entering the dormant state;

Step H, generating an unlock verification code by computing; determining whether data in the data cache is identical to the generated unlock verification code; in a case that the data in the data cache is identical to the generated unlock verification code, resetting the lock flag, setting the state identification to be the fifth predetermined value, clearing the data in the data cache, and performing Step L; and in a case that the data in the data cache is not identical to the generated unlock verification code, clearing the data in the data cache and performing Step C;

Step I, determining whether data in the data cache is identical to a logon password currently stored in the dynamic token; in a case that the data in the data cache is identical to the logon password currently stored in the dynamic token, setting the state identification to be the third predetermined value, clearing the data in the data cache, and performing Step L; and in a case that the data in the data cache is not identical to the logon password currently stored in the dynamic token, clearing the data in the data cache, setting the lock flag, and performing Step C;

Step J, generating a dynamic password by computing, displaying content corresponding to the dynamic password and performing Step L;

Step K, determining whether data in the data cache meets a predetermined condition; in a case that the data in the data cache meets the predetermined condition, replacing the logon password currently stored in the dynamic token with the data in the data cache, clearing the data in the data cache, setting the state identification to be the third predetermined value, and performing Step L; and in a case that the data in the data cache does not meet the predetermined condition, clearing the data in the data cache and performing Step L;

Step L, determining whether the key flag is detected to be set in a predetermined time period; in a case that the key flag is detected to be set in the predetermined time period, performing Step A; and in a case that the key flag is not detected to be set in the predetermined time period, resetting the power flag and entering the dormant state.

Alternatively, another working method of a dynamic token includes, after the dynamic token detects that its key flag is set, Step a, clearing the key flag, scanning keys and determining type of the key pressed down; performing Step b in a case that the key pressed down is a power key; performing Step d in a case that the key pressed down is a delete key; performing Step e in a case that the key pressed down is a key in a first numeric key group; performing Step f in a case that the key pressed down is a key in a second numeric key group; and performing Step g in a case that the key pressed down is an OK key;

Step b, checking power flag; in a case that the power flag is set, resetting the power flag and entering a dormant state; and in a case that the power flag is not set, setting the power flag and performing Step c;

Step c, checking lock flag; in a case that the lock flag is set, setting the state identification to be a first predetermined value and performing Step l; and in a case that the lock flag is not set, setting the state identification to be a second predetermined value and performing Step l;

Step d, checking the power flag; in a case that the power flag is set, checking state identification, deleting one unit data at the end of a corresponding cache, displaying a corresponding number, and performing Step l; and in a case that the power flag is not set, entering the dormant state;

Step e, checking the power flag; in a case that the power flag is set, checking the state identification, storing corresponding data into a corresponding cache, displaying a corresponding number, and performing Step l; and in a case that the power flag is not set, entering the dormant state;

Step f, checking the power flag;

in a case that the power flag is set and the state identification is a third predetermined value; determining whether time period for holding the key pressed down exceeds a predetermined time period; setting the state identification to be a fifth predetermined value and performing Step l in a case that the time period for holding the key pressed down exceeds the predetermined time period; and performing Step l directly in a case that the time period for holding the key pressed down does not exceed the predetermined time period;

in a case that the power flag is set and the state identification is not the third predetermined value, checking the state identification, storing corresponding data into a corresponding cache, displaying a corresponding number, and performing Step l; and in a case that the power flag is not set, entering the dormant state;

Step g, checking the power flag;

in a case that the power flag is set, checking the state identification; performing Step h in a case that the state identification is the first predetermined value; performing Step i in a case that the state identification is the second predetermined value; performing Step j in a case that the state identification is the third predetermined value; and performing Step k in a case that the state identification is the fifth predetermined value; and in a case that the power flag is not set, entering the dormant state;

Step h, generating an unlock verification code by computing; determining whether data in an unlock code cache is identical to the unlock verification code generated by computing; in a case that the data in the unlock code cache is identical to the unlock verification code generated by computing, resetting the lock flag, setting the state identification to be the fifth predetermined value, clearing the data in the unlock code cache, and performing Step l; and in a case that the data in the unlock code cache is not identical to the unlock verification code generated by computing, clearing the data in the unlock code cache and performing Step c;

Step i, determining whether data in a logon password cache is identical to a logon password currently stored in the dynamic token; in a case that the data in the logon password cache is identical to the logon password currently stored in the dynamic token, setting the state identification to be the third predetermined value, clearing the data in the logon password cache, and performing Step l; and in a case that the data in the logon password cache is not identical to the logon password currently stored in the dynamic token, clearing the data in the logon password cache, setting the lock flag, and performing Step c;

Step j, generating a dynamic password by computing, displaying content corresponding to the dynamic password, and performing Step l;

Step k, determining whether data in a new logon password cache meets a predetermined condition; in a case that the data in the new logon password cache meets the predetermined condition, replacing the logon password currently stored in the dynamic token with the data in the new logon password cache, clearing the data in the new logon password cache, setting the state identification to be the third predetermined value, and performing Step 1; and in a case that the data in the new logon password cache does not meet the predetermined condition, clearing the data in the new logon password cache and performing Step l;

Step l, determining whether the key flag is detected to be set in a predetermined time period; in a case that the key flag is detected to be set in the predetermined time period, performing Step A; and in a case that the key flag is not detected to be set in the predetermined time period, resetting the power flag and entering the dormant state.

The present invention has advantages of effectively preventing the dynamic token from being stolen, avoiding user loss caused by the dynamic token loss and the seed loss, and reducing possibility of successful group attack.

BRIEF DESCRIPTION OF THE DRAWINGS

In order to illustrate the technical solutions according to the embodiments of the present invention or the prior art more clearly, drawings to be used in the description of the embodiments or the prior art will be described briefly hereinafter. Apparently, the drawings described hereinafter are only some embodiments of the present invention, and other drawings may be obtained by those skilled in the art according to these drawings without creative labor.

DETAILED DESCRIPTION

The technical solutions according to the embodiments of the invention will be described clearly and completely in conjunction with the drawings in the embodiments of the invention. Apparently, the described embodiments are only part but not all of embodiments of the present invention. All other embodiments obtained by those skilled in the art based on these embodiments of the present invention without creative labor should fall within the scope of protection of the present invention.

First Embodiment

Figure 1:
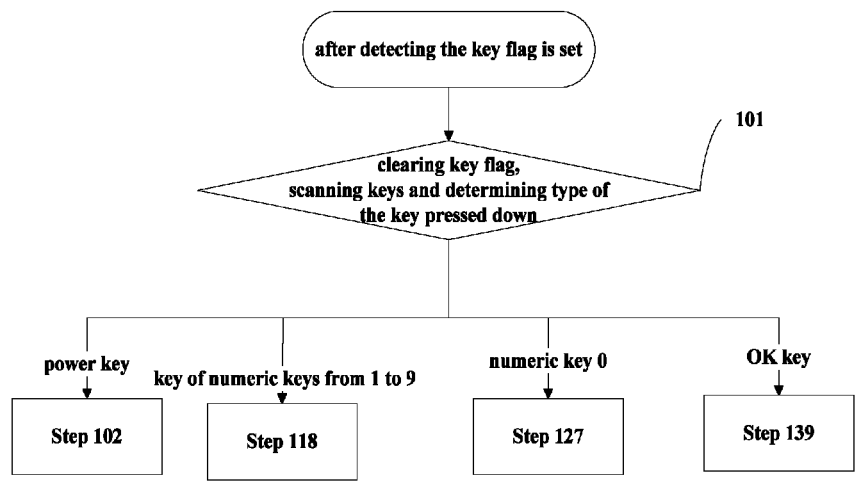
FIG. 1 is a flow chart of a working method of a dynamic token provided by a second embodiment of the present invention.
Figure 2:
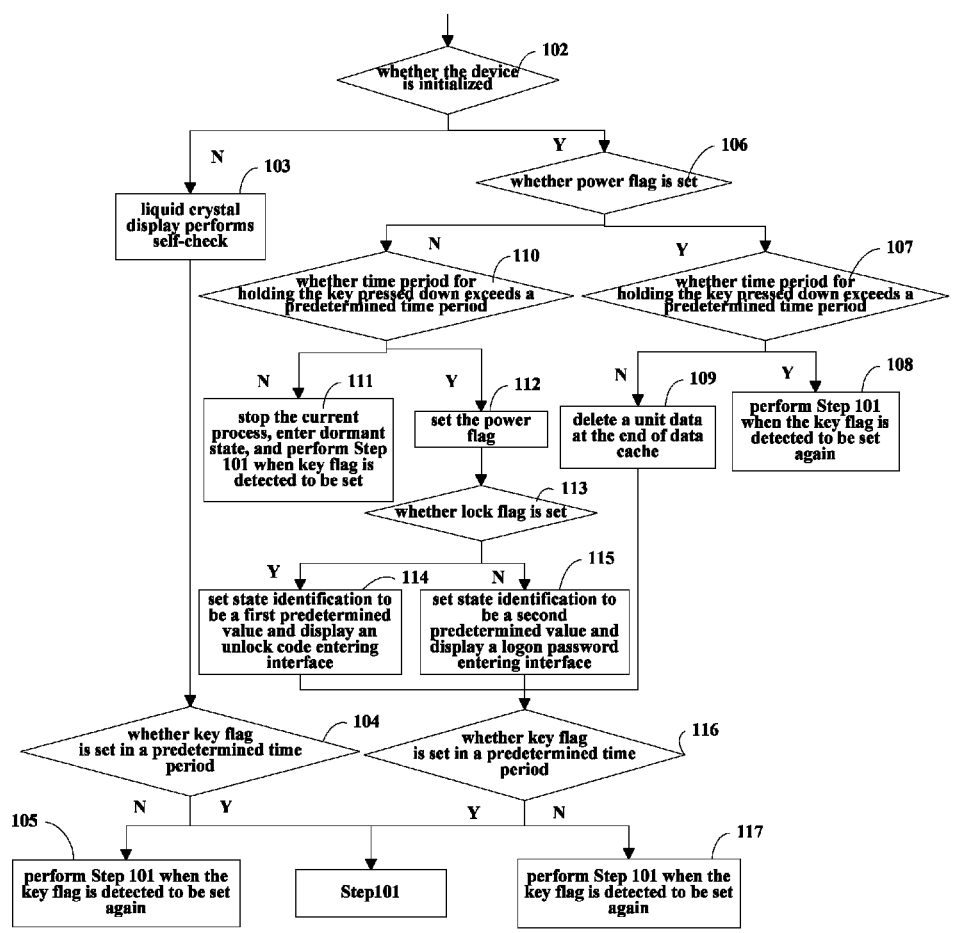
FIG. 2 is a flow chart of Step 102 to Step 117 in FIG. 1.
Figure 3:
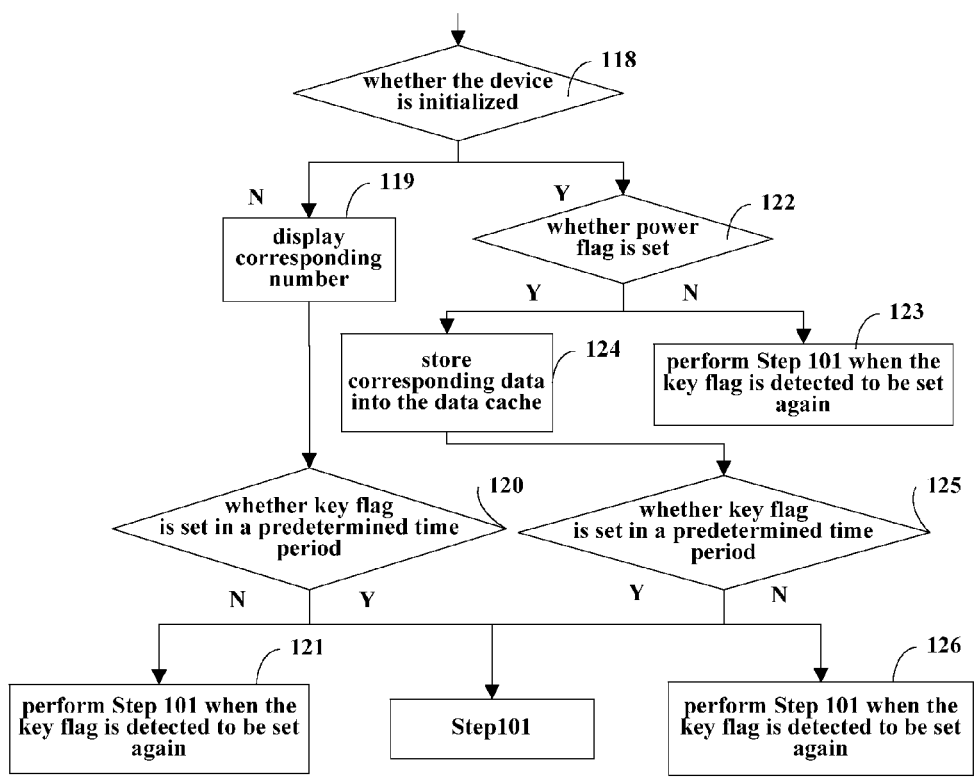
FIG. 3 is a flow chart of Step 118 to Step 126 in FIG. 1.
Figure 4:
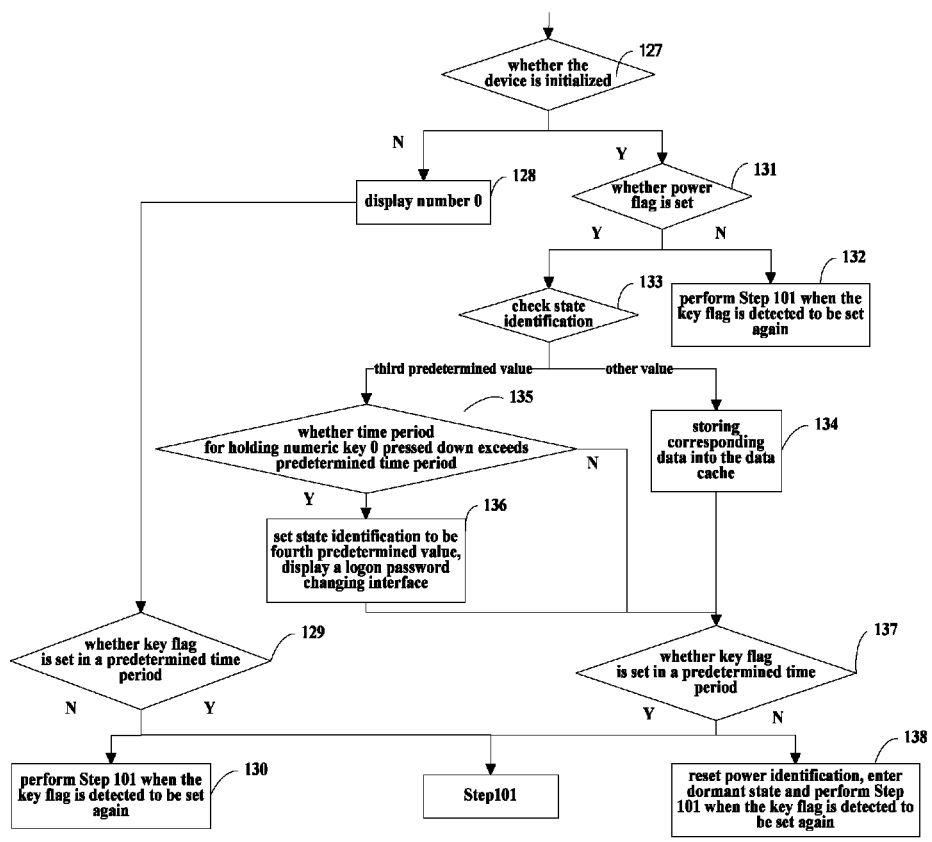
FIG. 4 is a flow chart of Step 127 to Step 138 in FIG. 1.
Figure 5A:
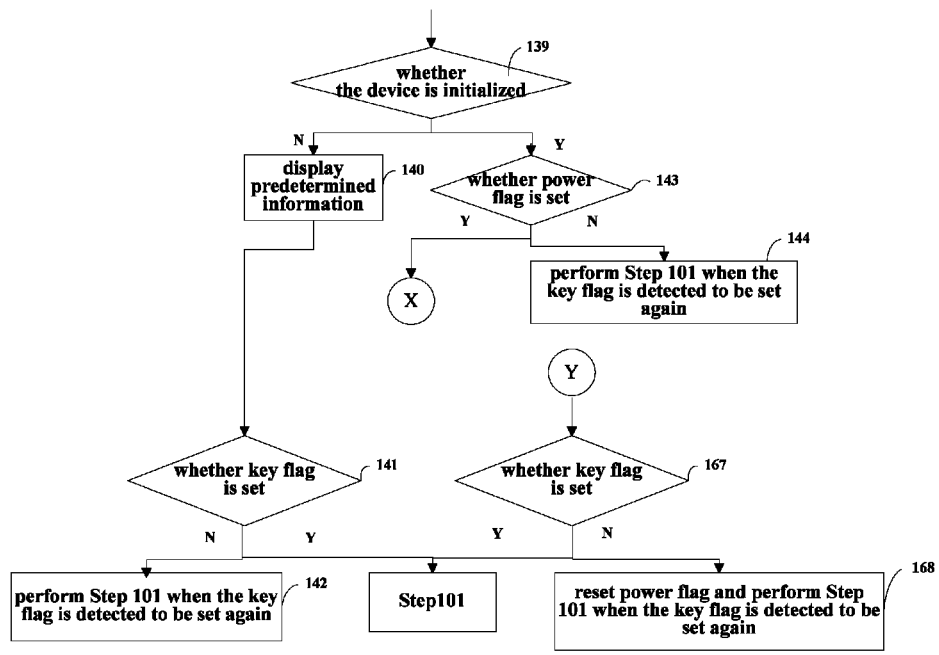
FIG. 5 is a flow chart of Step 139 to Step 171 in FIG. 1.
Figure 5B:
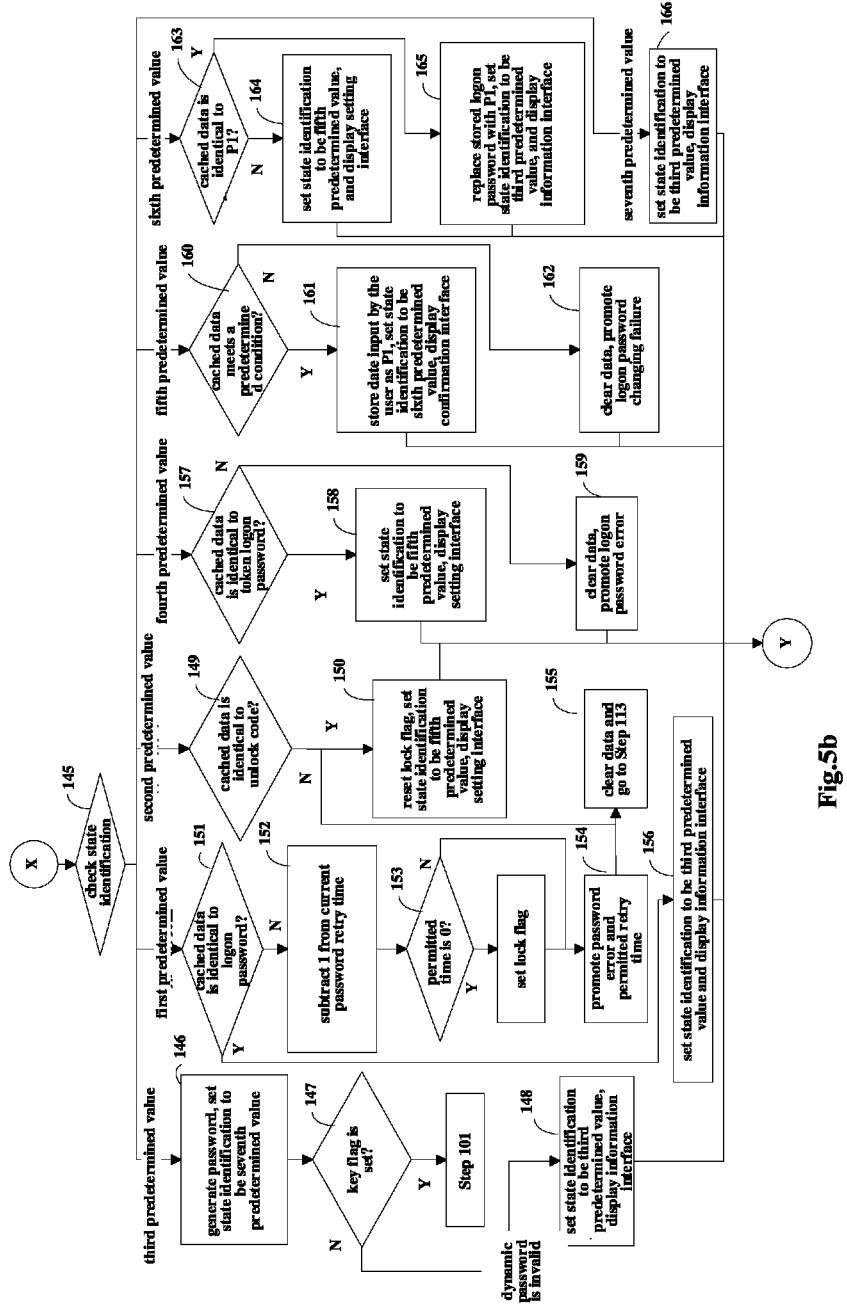
Figure 6:
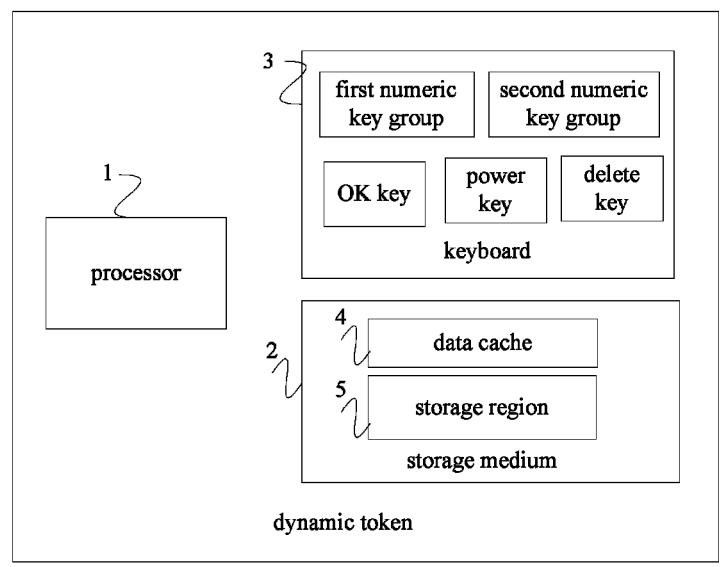
FIG. 6 is a structural diagram of a dynamic token according to an embodiment of the present invention.

In order to effectively prevent a dynamic token from being stolen and lost, and avoid seed file loss and group attack, a working method of a dynamic token is provided according to an embodiment of the present invention. The method is performed by a dynamic token. The dynamic token includes a processor 1, a storage medium 2 and a keyboard 3. The keyboard 3 includes a power key, a delete key, a first numeric key group, a second numeric key group and an OK key. The storage medium 2 includes a data cache 4 for storing input data and a storage region 5 for storing a key flag, a power flag, a lock flag, a state identification, a logon password, and optionally a permitted password retry time, as shown in FIG. 6. In the embodiment, the dynamic token is generally in dormant state. When a key is pressed down, the dynamic token is waken up and the key flag is set. When a power key is pressed down for a time period exceeding a predetermined time period, or when there is no key entry for a predetermined time period, the dynamic token enters the dormant state again, the state identification is restored to be a default value, and the current permitted password retry time and the current state of the lock flag are stored.

In a case that the key flag is detected to be set and the initialization of the dynamic token has not been finished, the dynamic token detects whether the liquid crystal screen and the keyboard are available according to the type of the key pressed down.

In a case that the key flag is detected to be set and the initialization of the dynamic token has been finished, the dynamic token performs the following Steps S1 to S18.

Step S1, clearing the key flag, scanning keys and determining the type of the key pressed down; performing Step S2 in a case that the key pressed down is a power key; performing Step S4 in a case that the key pressed down is a delete key; performing Step S5 in a case that the key pressed down is a key in a first numeric key group; performing Step S6 in a case that the key pressed down is a key in a second numeric key group; and performing Step S9 in a case that the key pressed down is an OK key.

The key may be a button, a touch key, a micro switch, a photoelectric switch or an inductive switch, etc.

The power key, the delete key and the OK key may be independent keys respectively, or may be any keys in the first numeric key group respectively, or any two of them may share one key.

If the power key is a key in the first number key group, and in this step, in a case that it is determined that the key pressed down is a key in the first numeric key group, it is determined whether the key is a first predetermined key. In a case that the key is the first predetermined key, it is determined whether the time period for holding the key pressed down exceeds a predetermined time period, Step S2 is performed in a case that the time period for holding the key pressed down exceeds the predetermined time period, and Step S5 is performed in a case that the time period for holding the key pressed down does not exceed the predetermined time period. In a case that the key is not the first predetermined key, Step S5 is performed.

If the delete key is a key in the first number key group, and in this step, in a case that it is determined that the key pressed down is a key in the first numeric key group, it is determined whether the key pressed down is a second predetermined key. In a case that the key pressed down is the second predetermined key, it is determined whether the time period for holding the key pressed down exceeds a predetermined time period, Step S4 is performed in a case that the time period for holding the key pressed down exceeds the predetermined time period, and Step S5 is performed in a case that the time period for holding the key pressed down does not exceed the predetermined time period. In a case that the key pressed down is not the second predetermined key, Step S5 is performed.

If the OK key is a key in the first numeric key group, and in this step, in a case that it is determined that the key pressed down is a key in the first numeric key group, it is determined whether the key pressed down is a third predetermined key. In a case that the key pressed down is the third predetermined key, it is determined whether the time period for holding the key pressed down exceeds a predetermined time period, Step S9 is performed in a case that the time period for holding the key pressed down exceeds the predetermined time period, and Step S5 is performed in a case that the time period for holding the key pressed down does not exceed the predetermined time period. In a case that the key pressed down is not the third predetermined key, Step S5 is performed.

If the power key and the delete key share one key, and in this step, in a case that it is determined that the key pressed down is the power key, it is determined whether the time period for holding the key pressed down exceeds a predetermined time period, Step S2 is performed in a case that the time period for holding the key pressed down exceeds the predetermined time period, and Step S4 is performed in a case that the time period for holding the key pressed down does not exceed the predetermined time period.

If the OK key and the power key share one key, and in this step, in a case that it is determined that the key pressed down is the OK key, it is determined whether the time period for holding the key pressed down exceeds a predetermined time period, Step S2 is performed in a case that the time period for holding the key pressed down exceeds the predetermined time period, and Step S9 is performed in a case that the time period for holding the key pressed down does not exceed the predetermined time period.

If the OK key and the delete key share one key, and in this step, in a case that it is determined that the key pressed down is the OK key, it is determined whether the time period for holding the key pressed down exceeds a predetermined time period, Step S4 is performed in a case that the time period for holding the key pressed down exceeds the predetermined time period, and Step S9 is performed in a case that the time period for holding the key pressed down does not exceed the predetermined time period.

Preferably, in the present embodiment, in order to prevent the key flag from being set due to interferences such as static electricity and bounce of a key itself, a key debounce process is performed after the token detects that the key flag is set. The key debounce process includes: after it is detected that the key flag is set, determining whether the time period for holding the key pressed down exceeds a predetermined time period; in a case that the time period for holding the key pressed down exceeds the predetermined time period, performing Step S1; and in a case that the time period for holding the key pressed down does not exceed the predetermined time period, clearing the key flag, entering the dormant state, and waiting for setting of the key flag. There are multiple ways for detecting the time period for holding the key pressed down, which are not limited herein.

Preferably, in the present embodiment, the predetermined time period is 20 milliseconds.

The key debounce process may also be realized by a hardware circuit, and may specifically be realized according to the characteristic of a RS trigger.

Step S2, checking the power flag; in a case that the power flag is set, resetting the power flag, entering the dormant state, and performing Step S1 when it is detected that the key flag is set again; and in a case that the power flag is not be set, setting the power flag and performing the next step.

Step S3, checking the lock flag; in a case that the lock flag is set, displaying information for prompting that the dynamic token is locked, setting the state identification to be a first predetermined value, displaying information for prompting entering the unlock code and performing step S15; and in a case that the lock flag is not set, setting the state identification to be a second predetermined value, displaying information for prompting entering the logon password, and performing Step S15.

Step S4, checking the power flag; in a case that the power flag is set, deleting one unit data at the end of the data cache, displaying the corresponding number and performing Step S15, or performing Step S15 directly if no data is in the data cache; and in a case that the power flag is not set, entering the dormant state, and performing Step S1 when it is detected that the key flag is set again.

One unit data in the data cache represents one number; and the unit data is coded or uncoded.

The displaying the corresponding number includes: displaying numbers corresponding to all unit data in the data cache. The displayed corresponding number is plain data, or is a symbol "-", or is the plain data for a fixed time period and then the symbol "-". The displaying manner may be selected according to the current value of the state identification if different predetermined values of the state identification correspond to different displaying manners.

Step S5, checking the power flag; in a case that the power flag is set, storing corresponding data into the data cache, displaying the corresponding number, and performing Step S15; and in a case that the power flag is not set, entering the dormant state, and performing Step S1 when it is detected that the key flag is set again.

In this step,
storing corresponding data into the data cache includes: determining whether the number of the unit data in the data cache exceeds a predetermined number according to the state identification, storing a predetermined number of unit data from the first or the last unit data in a case that the number of unit data in the data cache exceeds the predetermined number; and storing all unit data in a case that the number of unit data in the data cache does not exceed the predetermined number.

Step S6, checking the power flag; in a case that the power flag is set, performing the next step; and in a case that the power flag is not set, entering the dormant step, and performing Step S1 when it is detected that the key flag is set again.

Step S7, checking the state identification; in a case that the state identification is a third predetermined value, performing the next step; and in a case that the state identification is not the third predetermined value, storing corresponding data into the data cache, displaying the corresponding number, and performing Step S15.

Step S8, determining whether the time period for holding the key pressed down exceeds a predetermined time period; in a case that the time period for holding the key pressed down exceeds the predetermined time period, setting the state identification to be a fifth predetermined value, displaying information for prompting resetting the logon password, and performing Step S15; and in a case that the time period for holding the key pressed down does not exceed the predetermined time period, performing Step S15 directly.

Step S9, checking the power flag; in a case that it is detected that the power flag is set, performing the next step; and in a case that the power flag is not set, entering the dormant state, and performing Step S1 when it is detected that the key flag is set again.

Step S10, checking the state identification; performing Step S11 in a case that the state identification is the first predetermined value; performing Step S12 in a case that the state identification is the second predetermined value; performing Step S13 in a case that the state identification is the third predetermined value; and performing Step S14 in a case that the state identification is the fifth predetermined value.

Step S11, generating an unlock verification code by computing, determining whether the data in the data cache is identical to the unlock verification code generated by computing; in a case that the data in the data cache is identical to the unlock verification code generated by computing, resetting the lock flag, setting the state identification to be the fifth predetermined value, displaying information for prompting the user to reset the logon password, clearing the data in the data cache, and performing Step S15; and in a case that the data in the data cache is not identical to the unlock verification code generated by computing, clearing the data in the data cache and performing Step S3.

Step S12, determining whether the data in the data cache is identical to the logon password currently stored in the dynamic token; in a case that the data in the data cache is identical to the logon password currently stored in the dynamic token, setting the state identification to be the third predetermined value, displaying information for prompting that an information interface is entered, clearing the data in the data cache, and performing Step S15; and in a case that the data in the data cache is not identical to the logon password currently stored in the dynamic token, setting the lock flag, clearing the data in the data cache, and performing Step S3.

Preferably, a permitted password retry time may be set in the dynamic token.

Correspondingly, in a case that the lock flag is not set, it is determined whether the data in the data cache is identical to the logon password currently stored in the dynamic token. In a case that the data in the data cache is identical to the logon password currently stored in the dynamic token, the state identification is set to be the third predetermined value, information for prompting that an information interface is entered is displayed, the permitted password retry time is set to be the initial value, the data in the data cache is cleared, and Step S15 is performed. In a case that the data in the data cache is not identical to the logon password currently stored in the dynamic token, the data in the data cache is cleared, a result which is used as the current permitted password retry time is computed by subtracting 1 from the permitted password retry time, then it is determined whether the current permitted password retry time is 0, the lock flag is set and Step S3 is performed in a case that the current permitted password retry time is 0, and Step S3 is performed directly in a case that the current permitted password retry time is not 0.

Step S13, generating a dynamic password by computing, displaying content corresponding to the dynamic password, and performing Step S15.

Step S14, determining whether the data in the data cache meets a predetermined condition; in a case that the data in the data cache meets the predetermined condition, replacing the logon password currently stored in the dynamic token with the data in the data cache, setting the state identification to be the third predetermined value, displaying information for prompting that an information interface is entered, clearing the data in the data cache, and performing step S15; and in a case that the data in the data cache does not meet the predetermined condition, clearing the data in the data cache and performing Step S15.

Step S15, determining whether the key flag is detected to be set in a predetermined time period; in a case that the key flag is detected to be set in the predetermined time period, performing Step S1; and in a case that the key flag is not detected to be set in the predetermined time period, resetting the power flag, entering the dormant state, and performing Step S1 when it is detected that the key flag is set again.

Preferably, step S10 may further includes: performing Step S16 in a case that the state identification is a fourth predetermined value; performing Step S17 in a case that the state identification is a sixth predetermined value; performing Step S18 in a case that the state identification is a seventh predetermined value.

Step S16, determining whether the data in the data cache is identical to the logon password currently stored in the dynamic token; in a case that the data in the data cache is identical to the logon password currently stored in the dynamic token, setting the state identification to be the fifth predetermined value, displaying information for prompting resetting the logon password, clearing the data in the data cache, and performing Step S15; and in a case that the data in the data cache is not identical to the logon password currently stored in the dynamic token, clearing the data in the data cache and performing Step S15.

Correspondingly, Step S8 further includes: in a case that it is determined that the time period for holding the key pressed down exceeds the predetermined time period, setting the state identification to be the fourth predetermined value, displaying information for prompting entering the current logon password, and performing Step S15.

Step S17, determining whether the data in the data cache is identical to the new logon password; in a case that the data in the data cache is identical to the new logon password, replacing the logon password currently stored in the dynamic token with the new logon password, setting the state identification to be the third predetermined value, displaying information for promoting that an information interface is entered, clearing the data in the data cache, and performing Step S15; and in a case that the data in the data cache is not identical to the new logon password, setting the state identification to be the fifth predetermined value, displaying information for prompting resetting the logon password, clearing the data in the data cache, and performing Step S15.

Correspondingly, Step S14 further includes: in a case that the data in the data cache meets a predetermined condition, storing the data in the data cache as a new logon password, setting the state identification to be the sixth predetermined value, displaying information for prompting confirming the reset logon password, clearing the data in the data cache, and performing Step S15.

Step S18, setting the state identification to be the third predetermined value, and performing Step S15.

Correspondingly, Step S13 further includes: after generating the dynamic password by computing, setting the state identification to be a seventh predetermined value; determining whether the key flag is set before the dynamic password becomes invalid; in a case that the key flag is set before the dynamic password becomes invalid, performing Step S1; and in a case that the key flag is not set before the dynamic password becomes invalid, setting the state identification to be the third predetermined value when the dynamic password becomes invalid and performing Step S15.

Second Embodiment

In order to effectively prevent the dynamic token from being stolen and lost, and avoid seed file loss and group attack, a method for implementing a dynamic token is provided according to an embodiment of the present invention, in which the power key and the delete key share one key, numeric keys 1 to 9 are taken as a first numeric key group, and numeric key 0 is taken as a second numeric key group. In the embodiment, the dynamic token is generally in dormant state. When a key is pressed down, the dynamic token is waken up and the key flag is set. When the time period for holding the power key pressed down exceeds a predetermined time period or when there is no key entry for a predetermined time period, the dynamic token enters the dormant state again, the state identification is restored to be a default value, and the current permitted password retry time and current state of the lock flag are stored. Referring to FIG. 1, FIG. 2, FIG. 3, FIG. 4 and FIG. 5, the dynamic token performs the following Steps 101 to 168 after it is detected that the key flag is set.

Step 101, clearing the key flag, scanning the keyboard and determining the type of the key pressed down; performing Step 102 in a case that the key pressed down is a power key; performing Step 118 in a case that the key pressed down is any one of the numeric keys 1 to 9; performing Step 127 in a case that the key pressed down is the numeric key 0; and performing Step 139 in a case that the key pressed down is an OK key.

Step 102, determining whether the device is initialized, performing Step 106 in a case that the device is initialized, and performing the next step in a case that the device is not initialized.

The process for initializing the device is a process for writing user information into the dynamic token.

Step 103, the liquid crystal screen performing self-check.

Step 104, determining whether the key flag is detected to be set in a predetermined time period, performing Step 101 in a case that the key flag is detected to be set in the predetermined time period, and performing Step 105 in a case that the key flag is not detected to be set in the predetermined time period.

Step 105, entering the dormant state; and performing Step 101 when it is detected that the key flag is set again.

Step 106, checking whether the power flag is set, performing Step 107 in a case that the power flag is set, and performing Step 110 in a case that the power flag is not set.

Step 107, determining whether the time period for holding the power key pressed down exceeds a predetermined time period, performing Step 108 in a case that the time period for holding the key pressed down exceeds the predetermined time period, and performing Step 109 in a case that the time period for holding the key pressed down does not exceed the predetermined time period.

Preferably, in the second embodiment, the predetermined time period is 2 seconds.

Step 108, resetting the power flag, entering the dormant state, and performing Step 101 when it is detected that the key flag is set again.

Step 109, deleting one unit data at the end of the data cache, displaying the corresponding number, and performing Step 116; and if no data is in the data cache, skipping Step 109 and performing Step 116 directly.

One unit data in the data cache represents one number, and the one byte data is coded or uncoded. The displaying the corresponding number includes displaying numbers corresponding to all unit data in the data cache.

Step 110, determining whether the time period for holding the power key pressed down exceeds a predetermined time period, performing Step 111 in a case that the time period for holding the power key pressed down exceeds the predetermined time period, and performing Step 112 in a case that the time period for holding the power key pressed down does not exceed the predetermined time period.

Step 111, entering the dormant state; and performing Step 101 when it is detected that the key flag is set again.

Step 112, setting the power flag.

Step 113, detecting whether the lock flag is set, performing Step 114 in a case that the lock flag is set, and performing Step 115 in a case that the lock flag is not set.

Step 114, setting the state identification to be a first predetermined value, displaying an unlock code entering interface, and performing Step 116.

Step 115, setting the state identification to be a second predetermined value, and displaying a logon password entering interface.

Step 116, determining whether the key flag is detected to be set in a predetermined time period, performing Step 101 in a case that the key flag is detected to be set in the predetermined time period, and performing Step 117 in a case that the key flag is not detected to be set in the predetermined time period.

Step 117, resetting the power flag, entering the dormant state, and performing Step 101 when it is detected that the key flag is set again.

Step 118, determining whether the device is initialized, performing Step 122 in a case that the device is initialized, and performing Step 119 in a case that the device is not initialized.

Step 119, displaying the corresponding number.

Step 120, determining whether the key flag is detected to be set in a predetermined time period, performing Step 101 in a case that the key flag is detected to be set in the predetermined time period, and performing Step 121 in a case that the key flag is not detected to be set in the predetermined time period.

Step 121, entering the dormant state, and performing Step 101 when it is detected that the key flag is set again.

Step 122, detecting whether the power flag is set, performing Step 124 in a case that the power flag is set, and performing Step 123 in a case that the power flag is not set.

Step 123, entering the dormant state, and performing Step 101 when it is detected that the key flag is set again.

Step 124, storing the corresponding data into the data cache and displaying the corresponding number.

Preferably, in the present embodiment, in a case that the state identification is the second predetermined value or a fourth predetermined value or a fifth predetermined value or a sixth predetermined value, it is determined whether the number of the unit data in the data cache exceeds 6, the first or the last 6 unit data are stored in a case that the number of the unit data in the data cache exceeds 6, and all unit data are stored in a case that the number of the unit data in the data cache does not exceed 6. In a case that the state identification is the first predetermined value, it is determine whether the number of the unit data in the data cache exceeds 8, the first or the last 8 unit data are stored in a case that the number of the unit data in the data cache exceeds 8, and all unit data are stored in a case that the number of the unit data in the data cache does not exceeds 8.

The displaying the corresponding number includes displaying numbers corresponding to all unit data in the data cache.

The displayed corresponding number may be plain data, or may be a symbol such as "-" or "*", or may be plain data for some time period and then a symbol such as "-" or "*". If different state identifications correspond to different displaying manners, the displaying manner may be selected according to the state identification.

Step 125, determining whether the key flag is detected to be set in a predetermined time period, performing Step 101 in a case that the key flag is detected to be set in the predetermined time period, and performing Step 126 in a case that the key flag is not detected to be set in the predetermined time period.

Step 126, resetting the power flag, entering the dormant state, and performing Step 101 when it is detected that the key flag is set again.

Step 127, determining whether the device is initialized, performing Step 131 in a case that the device is initialized, and performing Step 128 in a case that the device is not initialized.

Step 128, displaying the number 0.

Step 129, determining whether the key flag is detected to be set in a predetermined time period, performing Step 101 in a case that the key flag is detected to be set in the predetermined time period, and performing Step 130 in a case that the key flag is not detected to be set in the predetermined time period.

Step 130, entering the dormant state, and performing Step 101 when it is detected that the key flag is set again.

Step 131, checking whether the power flag is set, performing Step 133 in a case that the power flag is set, and performing Step 132 in a case that the power flag is not set.

Step 132, entering the dormant state, and performing Step 101 when it is detected that the key flag is set again.

Step 133, checking the state identification; performing Step 135 in a case that the state identification is a third predetermined value, and performing Step 134 in a case that the state identification is not the third predetermined value.

Step 134, storing the corresponding data into the data cache, displaying the corresponding number, and performing Step 137.

The implementation of Step 134 is identical to that of Step 124, and the detailed description is omitted therein.

Step 135, determining whether the time period for holding the numeric key 0 pressed down exceeds a predetermined time period, performing Step 136 in a case that the time period for holding the numeric key 0 pressed down exceeds the predetermined time period, and performing Step 137 in a case that the time period for holding the numeric key 0 pressed down does not exceed the predetermined time period.

Step 136, setting the state identification to be the fourth predetermined value, displaying a logon password changing interface, and performing Step 137.

Step 137, determining whether the key flag is detected to be set in a predetermined time period, performing Step 101 in a case that the key flag is detected to be set in the predetermined time period, and performing Step 138 in a case that the key flag is not detected to be set in the predetermined time period.

Step 138, resetting the power flag, entering the dormant state, and performing Step 101 when it is detected that the key flag is set again.

Step 139, determining whether the device is initialized, performing Step 143 in a case that the device is initialized, and performing Step 140 in a case that the device is not initialized.

Step 140, displaying predetermined information.

In the present embodiment, the predetermined information is "success".

Step 141, determining whether the key flag is detected to be set in a predetermined time period, performing Step 101 in a case that the key flag is detected to be set in the predetermined time period, and performing Step 142 in a case that the key flag is not detected to be set in the predetermined time period.

Step 142, entering the dormant state, and performing Step 101 when it is detected that the key flag is set again.

Step 143, checking whether the power flag is set, performing Step 145 in a case that the power flag is set, and performing Step 144 in a case that the power flag is not set.

Step 144, entering the dormant state and performing Step 101 when it is detected that the key flag is set again.

Step 145, checking the state identification, performing Step 146 in a case that the state identification is the third predetermined value; performing Step 149 in a case that the state identification is the second predetermined value; performing Step 151 in a case that the state identification is the first predetermined value; performing Step 157 in a case that the state identification is the fourth predetermined value; performing Step 160 in a case that the state identification is the fifth predetermined value; performing Step 163 in a case that the state identification is the sixth predetermined value; and performing Step 166 in a case that the state identification is a seventh predetermined value.

Step 146, generating a dynamic password by computing, setting the state identification to be the seventh predetermined value and displaying content corresponding to the dynamic password.

In the present embodiment, the dynamic token generates a dynamic password with 6 digits by computing. The dynamic password may be generated according to a time factor (or an event factor) and a static factor pre-stored in the dynamic token, or according to a time factor (or an event factor), data in the data cache and a static factor pre-stored in the dynamic token, which is not limited herein.

Preferably, in the present embodiment, the displaying the corresponding data includes displaying the first four digits of the dynamic password and symbols "-" for the last two digits.

Further, a time bar may be displayed for representing the remained valid time of the current dynamic password.

Step 147, determining whether the key flag is detected to be set when the dynamic password is valid, performing Step 101 in a case that the key flag is detected to be set when the dynamic password is valid, and performing Step 148 when the dynamic password is invalid in a case that the key flag is not detected to be set when the dynamic password is valid.

Step 148, setting the state identification to be the third predetermined value, displaying an information interface, and performing Step 167.

Step 149, generating an unlock verification code by computing, and determining whether the data in the data cache is identical to the unlock verification code, performing Step 150 in a case that the data in the data cache is identical to the unlock verification code, and performing Step 155 in a case that the data in the data cache is not identical to the unlock verification code.

The dynamic token generates three unlock verification codes each of which has 8 digits by using a predetermined algorithm according to a static factor and a time factor (or an event factor), or according to a static factor, a time factor (or an event factor) and data in the data cache. The three unlock verification codes respectively correspond to the time factor previous to the current time factor, the current time factor and the time factor next to the current time factor, or respectively correspond to the current event factor, the event factor next to the current event factor and the event factor next to the next event factor of the current event factor.

Further, the determining whether the corresponding number in the data cache is identical to the unlock verification code includes determining whether the corresponding number in the data cache is identical to any one of the three unlock verification codes generated by the dynamic token.

Step 150, clearing the data in the data cache, resetting the lock flag, setting the state identification to be the fifth predetermined value, displaying a new logon password setting interface, and performing Step 167.

Step 151, determining whether the data in the data cache is identical to the logon password stored in the dynamic token, performing Step 156 in a case that the data in the data cache is identical to the logon password stored in the dynamic token, and performing Step 152 in a case that the data in the data cache is not identical to the logon password stored in the dynamic token.

Step 152, clearing the data in the data cache, and computing a result, which is used as the permitted password retry time, by subtracting 1 from the current password retry time.

In the present embodiment, if it is the first time that Step 152 is performed, the initial value of the current password retry time is 6; otherwise, the current password retry time is the permitted password retry time obtained by performing Step 152 last time.

Step 153, determining whether the permitted password retry time is 0; in a case that the permitted password retry time is 0, setting the lock flag and performing Step 154; and in a case that the permitted password retry time is not 0, performing Step 154 directly.

Step 154, prompting that the logon password is error, prompting the permitted password retry time, and performing Step 155.

Step 155, clearing the data in the data cache and performing Step 113.

Step 156, clearing the data in the data cache, setting the state identification to be the third predetermined value, displaying an information interface, and performing Step 167.

Step 157, determining whether the data in the data cache is identical to the logon password stored in the dynamic token, performing Step 158 in a case that the data in the data cache is identical to the logon password stored in the dynamic token, and performing Step 159 in a case that the data in the data cache is not identical to the logon password stored in the dynamic token.

Step 158, clearing the data in the data cache, setting the state identification to be the fifth predetermined value, displaying a new logon password setting interface, and performing Step 167.

Step 159, clearing the data in the data cache, prompting that the logon password is error, and performing Step 167.

Step 160, determining whether the data in the data cache meets a predetermined condition, performing Step 161 in a case that the data in the data cache meets the predetermined condition, and performing Step 162 in a case that the data in the data cache does not meet the predetermined condition.

Preferably, in the present embodiment, the data in the data cache meets the predetermined condition is that the data in the data cache corresponds to 6 digits which are numbers from 0 to 9.

Step 161, clearing the data in the data cache, storing the data entered by the user as P1, setting the state identification to be the sixth predetermined value, displaying a new logon password confirmation interface, and performing Step 167.

Step 162, clearing the data in the data cache, prompting failure of the logon password changing, and performing Step 167.

Step 163, determining whether the data in the data cache is identical to P1, performing Step 165 in a case that the data in the data cache is identical to P1, and performing Step 164 in a case that the data in the data cache is not identical to P1.

Step 164, clearing the data in the data cache, prompting failure of logon password changing, setting the state identification to be the fifth predetermined value, displaying a new logon password setting interface, and performing Step 167.

Step 165, clearing the data in the data cache, replacing the logon password stored in the dynamic token with P1, setting the state identification to be the third predetermined value, displaying an information interface, and performing Step 167.

Step 166, setting the state identification to be the third predetermined value and displaying an information interface.

Step 167, determining whether the key flag is detected to be set in a predetermined time period, performing Step 101 in a case that the key flag is detected to be set in the predetermined time period, and performing Step 168 in a case that the key flag is not detected to be set in the predetermined time period.

Step 168, resetting the power flag, entering the dormant state, and performing Step 101 when it is detected that the key flag is set again.

Third Embodiment

In order to effectively prevent a dynamic token from being stolen and lost, and avoid seed file loss and group attack, another working method of a dynamic token is provided according to an embodiment of the present invention. In the embodiment, the dynamic token is generally in a dormant state. When a key is pressed down, the dynamic token is waken up and the key flag is set. When a power key is pressed down for a time period exceeding a predetermined time period, or when there is no key entry for a predetermined time period, the dynamic token enters the dormant state again, the state identification is restored to be a default value, and the current permitted password retry time and the current state of the lock flag are stored.

In a case that the key flag is detected to be set and the initialization of the dynamic token has not been finished, the dynamic token detects whether the liquid crystal screen and the keyboard are available according to the type of the key pressed down.

In a case that the key flag is detected to be set and the initialization of the dynamic token has been finished, the dynamic token performs the following Steps 201 to 215.

Step 201, clearing the key flag, scanning keys and determine the type of the key pressed down; performing Step 202 in a case that the key pressed down is a power key; performing Step 203 in a case that the key pressed down is a delete key; performing Step 204 in a case that the key pressed down is a numeric key; and performing Step 206 in a case that the key pressed down is an OK key.

Preferably, in the third embodiment, in order to prevent the key flag from being set due to interferences such as static electricity and bounce of the key itself, a key debounce process is performed after the token detects that the key flag is set. The key debounce process includes: after it is detected that the key flag is set, determining whether the time period for holding the key pressed down exceeds a predetermined time period; in a case that the time period for holding the key pressed down exceeds the predetermined time period, performing Step S1; and in a case that the time period for holding the key pressed down does not exceed the predetermined time period, clearing the key flag, entering the dormant state, and waiting for setting of the key flag. There are multiple ways for detecting the time period for holding the key pressed down, which are not limited herein.

Preferably, in the present embodiment, the predetermined time period is 20 milliseconds.

The key debounce process may also be realized by a hardware circuit, and may specifically be realized according to the characteristic of a RS trigger.

Step 202, checking the power flag;

in a case that the power flag is set, resetting the power flag, entering the dormant state, and performing Step 201 when it is detected that the key flag is set again; and in a case that the power flag is not set, setting the power flag and performing Step 203.

Step 203, checking whether the lock flag is set; in a case that the lock flag is set, displaying information for promoting that the dynamic token has been locked, setting the state identification to be a first predetermined value, displaying information for promoting entering the unlock code, and performing Step 212; and in a case that the lock flag is not set, setting the state identification to be a second predetermined value, displaying information for promoting entering the logon password, and performing Step 212.

Step 204, checking the power flag;

in a case that the power flag is set, checking the state identification, deleting one corresponding unit data at the end of the corresponding cache, displaying the corresponding number, and performing Step 212, and performing Step 212 directly if no data is in the corresponding cache; and in a case that the power flag is not set, entering the dormant state, and performing Step 201 when it is detected that the key flag is set again.

Specifically, the checking the state identification and deleting one unit data at the end of the corresponding cache includes:

checking the state identification; in a case that the state identification is the first predetermined value, deleting a unit data at the end of the unlock code cache; in a case the state identification is the second predetermined value or a fourth predetermined value, deleting a unit data at the end of the logon password cache; in a case that the state identification is a fifth predetermined value, deleting a unit data at the end of the new logon password cache; in a case that the state identification is a sixth predetermined value, deleting a unit data at the end of the new logon password confirmation cache; and in a case that the state identification is other value, performing no operation.

One unit data in the data cache represents a number; and the one unit data is coded or uncoded.

The displaying the corresponding number includes: displaying numbers corresponding to all unit data in the data cache. The displayed corresponding number is plain data, or is a symbol "-", or is the plain data for a fixed time period and then the symbol "-". If different predetermined values of the state identification correspond to different displaying manners, the displaying manner may be selected according to the current value of the state identification.

Step 205, checking the power flag; in a case that the power flag is set, checking the state identification, storing corresponding data into the corresponding cache according to the value of the key, and performing Step 212; and in a case that the power flag is not set, entering the dormant state, and performing Step 201 when it is detected that the key flag is set again.

Specifically, the checking the state identification and storing corresponding data into the corresponding cache according to the value of the key includes: checking the state identification; in a case that the state identification is the first predetermined value, storing the corresponding data into the unlock code cache; in a case that the state identification is the second predetermined value or the fourth predetermined value, storing the corresponding data into the logon password cache; in a case that the state identification is the fifth predetermined value, storing the corresponding data into the new logon password cache; in a case that the state identification is the sixth predetermined value, storing the corresponding data into the new logon password confirmation cache; and in a case that the state identification is other value, performing no operation.

The storing corresponding data into the corresponding data cache includes: determining whether the number of the unit data in the corresponding cache exceeds a predetermined number according to the state identification; storing a predetermined number of unit data from the first or the last unit data in a case that the number of the unit data in the corresponding cache exceeds the predetermined number; and storing all unit data in a case that the number of the unit data in the corresponding cache does not exceed the predetermined number.

Step 206, checking the power flag;
in a case that the power flag is set, checking the state identification,
   in a case that the state identification is a third predetermined value, determining whether the time period for holding the key pressed down exceeds a predetermined time period;
      in a case that the time period for holding the key pressed down exceeds the predetermined time period, setting the state identification to be the fifth predetermined value, displaying information for promoting resetting the logon password, and performing Step 212; and
      in a case that the time period for holding the key pressed down does not exceed the predetermined time period, performing Step 212 directly; and
   in a case that the state identification is not the third predetermined value, storing the corresponding data into the corresponding cache, displaying the corresponding number, and performing Step 212; and
in a case that the power flag is not set, entering the dormant state, and performing Step 211 when it is detected that the key flag is set again.

The storing the corresponding data into the corresponding cache in a case that the state identification is not the third predetermined value includes: in a case that the state identification is the first predetermined value, storing the corresponding data into the unlock code cache; in a case that the state identification is the second predetermined value or the fourth predetermined value, storing the corresponding data into the logon password cache; in a case that the state identification is the fifth predetermined value, storing the corresponding data into the new logon password cache; in a case that the state identification is the sixth predetermined value, storing the corresponding data into the new logon password confirmation cache; and in a case that the state identification is other value, performing no operation.

Step 207, checking the power flag; in a case that the power flag is set, checking the state identification, performing Step 208 in a case that the state identification is the first predetermined value, performing Step 209 in a case that the state identification is the second predetermined value, performing Step 210 in a case that the state identification is the third predetermined value, and performing Step 211 in a case that the state identification is the fifth predetermined value; and in a case that the power flag is not set, entering the dormant state, and performing Step 201 when it is detected that the key flag is set again.

Step 208, generating an unlock verification code by computing; determine whether the data in the unlock code cache is identical to the generated unlock verification code; in a case that the data in the unlock code cache is identical to the generated unlock verification code, resetting the lock flag, setting the state identification to be the fifth predetermined value, displaying information for prompting the user to reset the logon password, clearing the data in the unlock code cache, and performing Step 212; and in a case that the data in the unlock code cache is not identical to the generated unlock verification code, clearing the data in the unlock code cache, and performing Step 203.

Specifically, the method for generating the unlock verification code by computing is the same as the method for generating the unlock verification code by computing in the second embodiment, and the detailed description is omitted herein.

Step 209, determining whether the data in the logon password cache is identical to the logon password currently stored in the dynamic token; in a case that the data in the logon password cache is identical to the logon password currently stored in the dynamic token, setting the state identification to be the third predetermined value, displaying information for prompting that an information interface is entered, clearing the data in the logon password cache, and performing Step 212; and in a case that the data in the logon password cache is not identical to the logon password currently stored in the dynamic token, setting the lock flag, clearing the data in the logon password cache, and performing Step 203.

Preferably, a permitted password retry time may be set in the dynamic token.

Correspondingly, in a case that the lock flag is not set, it is determined whether the data in the logon password cache is identical to the logon password currently stored in the dynamic token,
   in a case that the data in the logon password cache is identical to the logon password currently stored in the dynamic token, the state identification is set to be the third predetermined value, information for promoting that an information interface is entered is displayed, the permitted password retry time is set to be the initial value, the data in the logon password cache is cleared, and Step 212 is performed; and
   in a case that the data in the logon password cache is not identical to the logon password currently stored by the dynamic token, the data in the logon password cache is cleared, a result, which is used as the current permitted password retry time, is computed by subtracting 1 from the permitted password retry time, and it is determined whether the current permitted password retry time is 0, the lock flag is set and Step 203 is performed in a case that the current permitted password retry time is 0, and Step 203 is performed directly in a case that the current permitted password retry time is not 0.

Step 210, generating a dynamic password by computing, displaying content corresponding to the dynamic password, and performing Step 212.

Specifically, the method for generating the dynamic password by computing is the same as the method for generating the dynamic password by computing in the second embodiment, and the detailed description is omitted herein.

Step 211, determining whether the data in the new logon password cache meets a predetermined condition; in a case that the data in the new logon password cache meets the predetermined condition, replacing the logon password currently stored in the token with the data in the new logon password cache, setting the state identification to be the third predetermined value, displaying information for promoting that an information interface is entered, clearing the data in the new logon password cache, and performing Step 212; and in a case that the data in the new logon password cache does not meet the predetermined condition, clearing the data in the new logon password cache, and performing Step 212.

Step 212, determining whether the key flag is detected to be set in a predetermined time period; in a case that the key flag is detected to be set in the predetermined time period, performing Step 201; and in a case that the key flag is not detected to be set in the predetermined time period, resetting the power flag, entering the dormant state, and performing Step 201 when it is detected that the key flag is set again.

Preferably, Step 207 further includes: in a case that the state identification is the fourth predetermined value, performing Step 213; in a case that the state identification is the sixth predetermined value, performing Step 214; and in a case that the state identification is a seventh predetermined value, performing Step 215.

Step 213, determining whether the data in the logon password cache is identical to the logon password currently stored in the dynamic token; in a case that the data in the logon password cache is identical to the logon password currently stored in the dynamic token, setting the state identification to be the fifth predetermined value, displaying information for promoting resetting the logon password, clearing the data in the logon password cache, and performing Step 212; and in a case that the data in the logon password cache is not identical to the logon password currently stored in the dynamic token, clearing the data in the logon password cache, and performing Step 212.

Correspondingly, Step 206 further includes: in a case that it is determined the time period for holding the key pressed down exceeds the predetermined time period, setting the state identification to be the fourth predetermined value, displaying information for promoting entering the current logon password, and performing Step 212.

Step 214, determining whether the data in the logon password confirmation cache is identical to a new logon password; in a case that the data in the logon password confirmation cache is identical to the new logon password, replacing the logon password currently stored in the dynamic token with the new logon password, setting the state identification to be the third predetermined value, displaying information for promoting that an information interface is entered, clearing the data in the logon password confirmation cache, and performing Step 212; and in a case that the data in the logon password confirmation cache is not identical to the new logon password, setting the state identification to be the fifth predetermined value, displaying information for prompting resetting the logon password, clearing the data in the logon password confirmation cache, and performing Step 212.

Correspondingly, in Step 211, in a case that the data in the new logon password cache meets the predetermined condition, the data in the new logon password cache is stored as the new logon password, the state identification is set to be the sixth predetermined value, the information for prompting confirming the reset logon password is displayed, the data in the new logon password cache is cleared, and Step 212 is performed.

Step 215, setting the state identification to be the third predetermined value and performing Step 212.

Correspondingly, Step 210 further includes: after generating the dynamic password by computing, setting the state identification to be the seventh predetermined value and determining whether the key flag is set before the dynamic password becomes invalid; in a case that the key flag is set before the dynamic password becomes invalid, performing Step 201; and in a case that the key flag is not set before the dynamic password becomes invalid, setting the state identification to be the third predetermined value when the dynamic password becomes invalid, and performing Step 212.

Specifically, in the present embodiment, the unlock code cache and the logon password cache share a same storing region. In addition, there are other ways for cache sharing, for example, the unlock code cache and the new logon password cache may share a same storing region.

The above are only embodiments of the present invention. Any modification and equivalent substitute made by those skilled in the art within the technical scope of the present disclosure without any creative labor should fall into the protection scope of the present invention. The protection scope of the present invention should follow the protection scope of the claims.

The invention claimed is:

1. A method of a dynamic token, the method being performed by a processor, a storage medium and a keyboard; the storage medium comprising a data cache for storing data and a storage region for storing a key flag, a power flag, a lock flag, a state identification and a logon password; the keyboard comprising a power key, a delete key, a first numeric key group, a second numeric key group and an OK key, the method comprising:
   after the dynamic token detects that the key flag is set,
   (Step A) clearing the key flag, scanning the keys and determining type of the key pressed down; performing Step B in a case that the key pressed down is the power key; performing Step D in a case that the key pressed down is the delete key; performing Step E in a case that the key pressed down is a key in the first numeric key group; performing Step F in a case that the key pressed down is a key in the second numeric key group; and performing Step G in a case that the key pressed down is the OK key;
   (Step B) checking the power flag; in a case that the power flag is set, resetting the power flag and entering a dormant state; and in a case that the power flag is not set, setting the power flag and performing Step C;
   (Step C) checking the lock flag; in a case that the lock flag is set, setting the state identification to be a first predetermined value and performing Step L; and in a case that the lock flag is not set, setting the state identification to be a second predetermined value and performing Step L;
   (Step D) checking the power flag; in a case that the power flag is set, deleting one unit data at the end of the data cache, displaying numbers corresponding to all unit data in the data cache, and performing Step L; and in a case that the power flag is not set, entering the dormant state;
   (Step E) checking the power flag; in a case that the power flag is set, storing data corresponding to the key pressed down into the data cache, displaying numbers corresponding to all unit data in the data cache, and performing Step L; and in a case that the power flag is not set, entering the dormant state;

(Step F) checking the power flag;

in a case that the power flag is set and the state identification is a third predetermined value, determining whether time period for holding the key pressed down exceeds a predetermined time period; setting the state identification to be a fifth predetermined value and performing Step L in a case that the time period for holding the key pressed down exceeds the predetermined time period; and performing Step L directly in a case that the time period for holding the key pressed down does not exceed the predetermined time period;

in a case that the power flag is set and the state identification is not the third predetermined value, storing data corresponding to the key pressed down into the data cache, displaying numbers corresponding to all unit data in the data cache, and performing Step L;

in a case that the power flag is not set, entering the dormant state;

(Step G) checking the power flag;

in a case that the power flag is set, checking the state identification; performing Step H in a case that the state identification is the first predetermined value; performing Step I in a case that the state identification is the second predetermined value; performing Step J in a case that the state identification is the third predetermined value; and performing Step K in a case that the state identification is the fifth predetermined value; and in a case that the power flag is not set, entering the dormant state;

(Step H) generating an unlock verification code by performing computing on a dynamic factor and a static factor inside the dynamic token or on data in the data cache, a dynamic factor and a static factor inside in the dynamic token; determining whether the data in the data cache is identical to the generated unlock verification code; in a case that the data in the data cache is identical to the generated unlock verification code, resetting the lock flag, setting the state identification to be the fifth predetermined value, clearing the data in the data cache, and performing Step L; and in a case that the data in the data cache is not identical to the generated unlock verification code, clearing the data in the data cache and performing Step C;

(Step I) determining whether data in the data cache is identical to the logon password currently stored in the dynamic token; in a case that the data in the data cache is identical to the logon password currently stored in the dynamic token, setting the state identification to be the third predetermined value, clearing the data in the data cache, and performing Step L; and in a case that the data in the data cache is not identical to the logon password currently stored in the dynamic token, clearing the data in the data cache, setting the lock flag, and performing Step C;

(Step J) generating a dynamic password by performing computing on a dynamic factor and the static factor pre-stored in the dynamic token or on a dynamic factor, data in the data cache and a static factor pre-stored in the dynamic token, displaying content corresponding to the dynamic password and performing Step L;

(Step K) determining whether data in the data cache meets a predetermined condition; in a case that the data in the data cache meets the predetermined condition, replacing the logon password currently stored in the dynamic token with the data in the data cache, clearing the data in the data cache, setting the state identification to be the third predetermined value, and performing Step L; and in a case that the data in the data cache does not meet the predetermined condition, clearing the data in the data cache and performing Step L;

(Step L) determining whether the key flag is detected to be set in a predetermined time period; in a case that the key flag is detected to be set in the predetermined time period, performing Step A; and in a case that the key flag is not detected to be set in the predetermined time period, resetting the power flag and entering the dormant state, wherein the method further comprises:

after the key flag is detected to be set, determining whether time period for holding the key pressed down exceeds a predetermined time period; in a case that the time period for holding the key pressed down exceeds the predetermined time period, performing Step A; and in a case that the time period for holding the key pressed down does not exceed the predetermined time period, clearing the key flag, entering the dormant state and waiting for next setting of the key flag.

2. The method of claim 1, wherein the method further comprises: performing initialization of the dynamic token; after the dynamic token detects that its key flag is set, determining whether initialization of the dynamic token has been finished; in a case that the initialization of the dynamic token has been finished, performing Step A; and in a case that the initialization of the dynamic token has not been finished, detecting whether a liquid crystal display and the key are available by the dynamic token according to the type of the key pressed down.

3. The method of claim 1, wherein the method further comprises, after the dynamic token determines that the key pressed down is the power key, determining whether time period for holding the power key pressed down exceeds a predetermined time period, performing Step B in a case that the time period for holding the power key pressed down exceeds the predetermined time period, and performing Step D in a case that the time period for holding the power key pressed down does not exceed the predetermined time period.

4. The method of claim 1, wherein the storage region of the dynamic token further stores a permitted password retry time; and in a case that the dynamic token enters the dormant state, the state identification is restored to be a default value, the current permitted password retry time and state of the lock flag are stored, and Step A is performed when it is detected that the key flag is set again;

in Step I,
in a case that it is determined that the data in the data cache is identical to the logon password currently stored in the dynamic token, the method further comprises setting the permitted password retry time to be an initial value;

in a case that it is determined that the data in the data cache is not identical to the logon password currently stored in the dynamic token, the method further comprises: clearing the data in the data cache; computing a result, which is used as the current permitted password retry time, by subtracting 1 from the permitted password retry time; determining whether the current permitted password retry time is 0; setting the lock flag and performing Step L in a case that the current permitted password retry time is 0; and performing Step L directly in a case that the current permitted password retry time is not 0; and in Step D, in a case that the power flag is set, Step L is performed directly if no data is in the data cache.

5. The method of claim 1, wherein the generating an unlock verification code by performing computing on a dynamic factor and a static factor inside the dynamic token or on data in the data cache, a dynamic factor and a static factor inside in the dynamic token comprises:
    generating one or a plurality of unlock verification codes with a predetermined number of digits by using a predetermined algorithm by the dynamic token according to its inside static factor and a dynamic factor, or according to data in the data cache and its inside static factor and a dynamic factor, wherein the dynamic factor is a time factor or an event factor;
    in a case that one unlock verification code is generated, the dynamic factor is a current dynamic factor;
    in a case that a plurality of unlock verification codes are generated, the dynamic factor comprises a plurality of dynamic factors with the current dynamic factor as a middle point or a starting point; and
    the determining whether data in the data cache is identical to the generated unlock verification code comprises: determining whether the data in the data cache is identical to the one unlock verification code or any one of the plurality of unlock verification codes.

6. The method of claim 1, wherein the generating a dynamic password by performing computing on a dynamic factor and a static factor pre-stored in the dynamic token or on a dynamic factor, data in the data cache and a static factor pre-stored stored in the dynamic token comprises:
    generating a dynamic password with 6 digits by the dynamic token according to a dynamic factor and a static factor pre-stored in the dynamic token, or according to a dynamic factor, data in the data cache and a static factor pre-stored in the dynamic token, wherein the dynamic factor is a time factor or an event factor; and
    the displaying content corresponding to the dynamic password comprises: displaying first four digits of the dynamic password and symbols "-" for last two digits.

7. The method of claim 1, wherein Step G further comprises:
    performing Step M in a case that the state identification is a fourth predetermined value;
    Step M comprises: determining whether data in the data cache is identical to the logon password currently stored in the dynamic token; in a case that the data in the data cache is identical to the logon password currently stored in the dynamic token, setting the state identification to be the fifth predetermined value, clearing the data in the data cache, and performing Step L; and in a case that the data in the data cache is not identical to the logon password currently stored in the dynamic token, clearing the data in the data cache and performing Step L; and
    Step F further comprises: in a case that it is determined that the time period for holding the key pressed down exceeds the predetermined time period, setting the state identification to be the fourth predetermined value and performing Step L.

8. The method of claim 1, wherein the storage region of the dynamic token further stores a new logon password, and Step G further comprises:
    performing Step N in a case that the state identification is a sixth predetermined value;
    Step N comprises: determining whether data in the data cache is identical to the new logon password; in a case that the data in the data cache is identical to the new logon password, replacing the logon password currently stored in the dynamic token with the new logon password, setting the state identification to be the third predetermined value, clearing the data in the data cache, and performing Step L; and in a case that the data in the data cache is not identical to the new logon password, clearing the data in the data cache, setting the state identification to be the fifth predetermined value, and performing Step L; and
    Step K further comprises: in a case that it is determined that the data in the data cache meets the predetermined condition, storing the data in the data cache as the new logon password, setting the state identification to be the sixth predetermined value, clearing the data in the data cache, and performing Step L.

9. The method of claim 1, wherein Step G further comprises:
    performing Step O in a case that the state identification is a seventh predetermined value;
    Step O comprises: setting the state identification to be the third predetermined value and performing Step L; and
    Step J further comprises: after generating the dynamic password by performing computing on a dynamic factor and a static factor pre-stored in the dynamic token or on a dynamic factor, data in the data cache and a static factor pre-stored in the dynamic token, setting the state identification to be the seventh predetermined value; determining whether the key flag is detected to be set before the dynamic password becomes invalid; in a case that the key flag is detected to be set before the dynamic password becomes invalid, performing Step A; and in a case that the key flag is not detected to be set before the dynamic password becomes invalid, setting the state identification to be the third predetermined value when the dynamic password becomes invalid and performing Step L.

10. A method of a dynamic token, the method being performed by a processor, a storage medium and a keyboard; the storage medium comprising a data cache for storing data and a storage region for storing a key flag, a power flag, a lock flag, a state identification and a logon password; the keyboard comprising a power key, a delete key, a first numeric key group, a second numeric key group and an OK key, the method comprising:
    after the dynamic token detects that the key flag is set,
    (Step a) clearing the key flag, scanning the keys and determining type of the key pressed down; performing Step b in a case that the key pressed down is the power key; performing Step d in a case that the key pressed down is the delete key;
    performing Step e in a case that the key pressed down is a key in the first numeric key group; performing Step f in a case that the key pressed down is a key in the second numeric key group; and performing Step g in a case that the key pressed down is the OK key;
    (Step b) checking the power flag; in a case that the power flag is set, resetting the power flag and entering a dormant state; and in a case that the power flag is not set, setting the power flag and performing Step c;
    (Step c) checking the lock flag; in a case that the lock flag is set, setting the state identification to be a first predetermined value and performing Step I; and in a case that the lock flag is not set, setting the state identification to be a second predetermined value and performing Step I;
    (Step d) checking the power flag; in a case that the power flag is set, checking the state identification, deleting one unit data at the end of a corresponding cache, displaying numbers corresponding to all unit data in the corresponding cache, and performing Step I; and in a case that the power flag is not set, entering the dormant state;

(Step e) checking the power flag; in a case that the power flag is set, checking the state identification, storing data corresponding to the key pressed down into a corresponding cache, displaying numbers corresponding to all unit data in the corresponding cache, and performing Step I; and in a case that the power flag is not set, entering the dormant state;

(Step f) checking the power flag;

in a case that the power flag is set and the state identification is a third predetermined value, determining whether time period for holding the key pressed down exceeds a predetermined time period; setting the state identification to be a fifth predetermined value and performing Step I in a case that the time period for holding the key pressed down exceeds the predetermined time period; and performing Step I directly in a case that the time period for holding the key pressed down does not exceed the predetermined time period;

in a case that the power flag is set and the state identification is not the third predetermined value, checking the state identification, storing data corresponding to the key pressed down into a corresponding cache, displaying numbers corresponding to all unit data in the corresponding cache, and performing Step I;

in a case that the power flag is not set, entering the dormant state;

(Step g) checking the power flag;

in a case that the power flag is set, checking the state identification; performing Step h in a case that the state identification is the first predetermined value; performing Step i in a case that the state identification is the second predetermined value; performing Step j in a case that the state identification is the third predetermined value; and performing Step k in a case that the state identification is the fifth predetermined value; and in a case that the power flag is not set, entering the dormant state;

(Step h) generating an unlock verification code by performing computing on a dynamic factor and a static factor inside the dynamic token or on data in a data cache, a dynamic factor and a static factor inside in the dynamic token; determining whether data in an unlock code cache is identical to the generated unlock verification code; in a case that the data in the unlock code cache is identical to the generated unlock verification code, resetting the lock flag, setting the state identification to be the fifth predetermined value, clearing the data in the unlock code cache, and performing Step I; and in a case that the data in the unlock code cache is not identical to the generated unlock verification code, clearing the data in the unlock code cache and performing Step c;

(Step i) determining whether data in the logon password cache is identical to the logon password currently stored in a storage region of the dynamic token; in a case that the data in the logon password cache is identical to the logon password currently stored in the storage region of the dynamic token, setting the state identification to be the third predetermined value, clearing the data in the logon password cache, and performing Step I; and in a case that the data in the logon password cache is not identical to the logon password currently stored in the storage region of the dynamic token, clearing the data in the logon password cache, setting the lock flag, and performing Step c;

(Step j) generating a dynamic password by performing computing on a dynamic factor and a static factor pre-stored in the dynamic token or on a dynamic factor, data in the data cache and a static factor pre-stored in the dynamic token, displaying content corresponding to the dynamic password, and performing Step I;

(Step k) determining whether data in the new logon password cache meets a predetermined condition; in a case that the data in the new logon password cache meets the predetermined condition, replacing the logon password currently stored in the storage region of the dynamic token with the data in the new logon password cache, clearing the data in the new logon password cache, setting the state identification to be the third predetermined value, and performing Step I; and in a case that the data in the new logon password cache does not meet the predetermined condition, clearing the data in the new logon password cache and performing Step I;

(Step I) determining whether the key flag is detected to be set in a predetermined time period;

in a case that the key flag is detected to be set in the predetermined time period, performing Step A; and in a case that the key flag is not detected to be set in the predetermined time period, resetting the power flag and entering the dormant state, wherein the checking the state identification, deleting one number at the end of a corresponding cache comprises: checking the state identification;

deleting one number at the end of the unlock code cache in a case that the state identification is the first predetermined value; deleting one number at the end of the logon password cache in a case that the state identification is the second predetermined value or fourth predetermined value; deleting one number at the end of the new logon password cache in a case that the state identification is the fifth predetermined value; and performing no operation in a case that the state identification is other value; and the storing the data corresponding to the key pressed down into a corresponding cache comprises: checking the state identification; storing the data corresponding to the key pressed down into the unlock code cache in a case that the state identification is the first predetermined value; storing the data corresponding to the key pressed down into the logon password cache in a case that the state identification is the second or the fourth predetermined value; storing the data corresponding to the key pressed down into the new logon password cache in a case that the state identification is the fifth predetermined value; and performing no operation in a case that the state identification is other value, wherein the method further comprises:

after the key flag is detected to be set, determining whether time period for holding the key pressed down exceeds a predetermined time period; in a case that the time period for holding the key pressed down exceeds the predetermined time period, performing Step a; and in a case that the time period for holding the key pressed down does not exceed the predetermined time period, clearing the key flag, entering the dormant state, and waiting for next setting of the key flag.

11. The method of claim 10, wherein, the method further comprises: performing initialization of the dynamic token; after the dynamic token detects that the key flag is set, determining whether initialization of the dynamic token has been finished; in a case that the initialization of the dynamic token has been finished, performing Step a; and in a case that the initialization of the dynamic token has not been finished, detecting whether a liquid crystal display and the key are available by the dynamic token according to a type of the key pressed down.

12. The method of claim 10, wherein, the method further comprises, after the dynamic token determines that the key pressed down is the power key, determining whether time period for holding the power key pressed down exceeds a predetermined time period; performing Step b in a case that the time period for holding the power key pressed down exceeds the predetermined time period; and performing Step d in a case that the time period for holding the power key pressed down does not exceed the predetermined time period.

13. The method of claim 10, wherein, the storage region of the dynamic token further stores a permitted password retry time; and in a case that the dynamic token enters the dormant state, the state identification is restored to be a default value, the current permitted password retry time and state of the lock flag are stored, and Step a is performed when it is detected that the key flag is set again;
  in Step i,
    in a case that it is determined that the data in the logon password cache is identical to the logon password currently stored in the storage region of the dynamic token, the method further comprises setting the permitted password retry time to be an initial value;
    in a case that it is determined that the data in the logon password cache is not identical to the logon password currently stored in the storage region of the dynamic token, the method further comprises: clearing the data in the logon password cache; computing a result, which is used as the current permitted password retry time, by subtracting 1 from the permitted password retry time; determining whether the current permitted password retry time is 0; setting the lock flag and performing Step I in a case that the current permitted password retry time is 0; and performing Step I directly in a case that the current permitted password retry time is not 0; and
  in Step d, in a case that the power flag is set, Step I is performed directly if no data is in the corresponding cache.

14. The method of claim 10, wherein Step g further comprises:
  performing Step m in a case that the state identification is a fourth predetermined value;
  Step m comprises: determining whether data in the logon password cache is identical to the logon password currently stored in the storage region of the dynamic token; in a case that the data in the logon password cache is identical to the logon password currently stored in the storage region of the dynamic token, setting the state identification to be the fifth predetermined value, clearing the data in the logon password cache and performing Step I; and in a case that the data in the logon password cache is not identical to the logon password currently stored in the storage region of the dynamic token, clearing the data in the logon password cache and performing Step I; and
  Step f further comprises: in a case that the time period for holding the key pressed down exceeds the predetermined time period, setting the state identification to be the fourth predetermined value and performing Step I.

15. The method of claim 10, wherein Step g further comprises:
  performing Step n in a case that the state identification is a sixth predetermined value;
  Step n comprises: determining whether data in a logon password confirmation cache is identical to a new logon password stored in the storage region of the dynamic token; in a case that the data in the logon password confirmation cache is identical to the new logon password stored in the storage region of the dynamic token, replacing the logon password currently stored in the storage region of the dynamic token with the new logon password, setting the state identification to be the third predetermined value, clearing the data in the logon password confirmation cache, and performing Step I; and in a case that the data in the logon password confirmation cache is not identical to the new logon password stored in the storage region of the dynamic token, clearing the data in the logon password confirmation cache, setting the state identification to be the fifth predetermined value, and performing Step I; and
  Step k further comprises: in a case that data in the new logon password cache meets the predetermined condition, storing the data in the new logon password cache as the new logon password, setting the state identification to be the sixth predetermined value, clearing the data in the new logon password cache, and performing Step I.

16. The method of claim 10, wherein Step g further comprises:
  performing Step o in a case that the state identification is a seventh predetermined value;
  Step o comprises: setting the state identification to be the third predetermined value and performing Step I; and
  Step j further comprises: after generating the dynamic password by performing computing on a dynamic factor and a static factor pre-stored in the dynamic token or on a namic factor data in the data cache and a static factor pre-stored in the dynamic token, setting the state identification to be the seventh predetermined value, determining whether the key flag is detected to be set before the dynamic token becomes invalid; in a case that the key flag is detected to be set before the dynamic token becomes invalid, performing Step a; and in a case that the key flag is not detected to be set before the dynamic token becomes invalid, setting the state identification to be the third predetermined value when the dynamic token becomes invalid and performing Step I.

17. The method of claim 1, wherein:
one unit data represents one number in the data cache, and the one unit data is coded or uncoded;
the storing data corresponding to the key pressed down into the data cache comprises: determining whether the number of unit data in the data cache exceeds a predetermined number according to the state identification; storing a predetermined number of unit data from the first or the last unit data in a case that the number of unit data in the data cache exceeds the predetermined number; and storing all unit data in a case that the number of unit data in the data cache does not exceed the predetermined number; and
the displaying numbers corresponding to all unit data in the data cache comprises: displaying numbers corresponding to all unit data in the data cache with the displayed numbers being plain data, or being a symbol "-", or being the plain data for a fixed time period and then the symbol "-", and displaying manner is selected according to a current value of the state identification if different predetermined values of the state identification correspond to different displaying manners.

18. The method of claim 10, wherein:
one unit data represents one number in the corresponding cache, and the one unit data is coded or uncoded;

the storing the data corresponding to the key pressed down into a corresponding cache comprises: determining whether the number of unit data in the corresponding cache exceeds a predetermined number according to the state identification; storing a predetermined number of unit data from the first or the last unit data in a case that the number of unit data in the corresponding cache exceeds the predetermined number; and storing all unit data in a case that the number of unit data in the corresponding cache does not exceed the predetermined number; and the displaying numbers corresponding to all unit data in the data cache comprises: displaying the numbers corresponding to all unit data in the data cache with the displayed numbers being plain data, or being a symbol "-", or being the plain data for a fixed time period and then the symbol "-", and displaying manner is selected according to a current value of the state identification if different predetermined values of the state identification correspond to different displaying manners.

* * * * *